(12) United States Patent
Iwago et al.

(10) Patent No.: US 7,611,145 B2
(45) Date of Patent: Nov. 3, 2009

(54) AUTOMATIC DOCUMENT FEEDER

(75) Inventors: Toshitaka Iwago, Okazaki (JP); Yoichi Horaguchi, Tajimi (JP); Ryoichi Matsushima, Nagoya (JP)

(73) Assignee: Brother Kogyo Kabushiki Kaisha (JP)

( * ) Notice: Subject to any disclaimer, the term of this patent is extended or adjusted under 35 U.S.C. 154(b) by 345 days.

(21) Appl. No.: 11/515,765

(22) Filed: Sep. 6, 2006

(65) Prior Publication Data
US 2007/0052150 A1    Mar. 8, 2007

(30) Foreign Application Priority Data
Sep. 6, 2005    (JP)    ............... 2005-258477

(51) Int. Cl.
*B65H 39/10*    (2006.01)
(52) U.S. Cl. ............... 271/291; 271/264; 399/364
(58) Field of Classification Search ............... 271/264, 271/65, 291, 303, 186; 399/364
See application file for complete search history.

(56) References Cited

U.S. PATENT DOCUMENTS

| | | | |
|---|---|---|---|
| 5,689,793 A | | 11/1997 | Kobayashi et al. |
| 5,819,152 A | | 10/1998 | Kobayashi et al. |
| 5,826,155 A | | 10/1998 | Kobayashi et al. |
| 5,903,811 A | | 5/1999 | Kobayashi et al. |
| 6,038,424 A | * | 3/2000 | Nakagawa ............... 399/367 |
| 6,161,831 A | * | 12/2000 | Kusakabe et al. ......... 271/186 |
| 6,209,861 B1 | * | 4/2001 | Kakuta et al. ............ 271/3.02 |
| 6,215,976 B1 | * | 4/2001 | Shida et al. .............. 399/367 |
| 6,522,860 B2 | * | 2/2003 | Nose et al. ............... 399/374 |
| 2003/0193135 A1 | * | 10/2003 | Suzuki ..................... 271/303 |
| 2004/0140609 A1 | * | 7/2004 | Asako ...................... 271/264 |
| 2006/0285902 A1 | * | 12/2006 | Horaguchi ................ 399/374 |

FOREIGN PATENT DOCUMENTS

| | | |
|---|---|---|
| JP | 813351 | 5/1996 |
| JP | 2002077519 | 3/2002 |

* cited by examiner

*Primary Examiner*—Patrick H Mackey
*Assistant Examiner*—Michael C McCullough
(74) *Attorney, Agent, or Firm*—Hanner & Witcoff, Ltd.

(57) ABSTRACT

An automatic document feeder, which is capable of feeding a document for double-sided reading, includes a document feed path connecting an input tray and an output tray, a bidirectional feed path connected to a connection position of the document feed path, a bypass diverged from a branch position of the document feed path and connected to the connection position, a guide flap that changes a position thereof between a first guide position and a second guide position, and a guide flap that changes a position thereof between a third guide position and a fourth guide position.

15 Claims, 14 Drawing Sheets

AUTOMATIC DOCUMENT FEEDER

CROSS REFERENCE TO RELATED APPLICATIONS

This application claims priority from the Japanese Patent Application No. 2005-258477 filed on Sep. 6, 2005, the entire subject matter of which is incorporated herein by reference.

FIELD OF THE INVENTION

Illustrative aspects of the invention relate to automatic document feeders suited for the double-sided reading of documents and to image reading apparatuses including the automatic document feeders.

BACKGROUND

Image reading apparatuses included in copiers, scanners, and multifunction apparatuses having a copy function and a scanning function, contain auto document feeders ("ADF") to feed documents from an input tray through a feed path to an output tray. In addition, in order to read a document printed on a first surface and a second surface, known document feeders that feed a document for double-sided reading by reversing the document's leading end trailing.

FIG. 14 shows a feed path in a conventional document feeder capable of double-sided reading. As shown in the figure, a document P is placed on an input tray 90 with a first surface (a first page) facing upward. This document P is fed to a feed path 92 by a pickup roller 91. In the feed path 92, the document P is fed by feed rollers 93 provided as appropriate, and the first surface of the document P is read by an image reading device, such as CCD or CIS, when the document P passes a reading position X. When a sensor detects a trailing end of the document P, of which the first surface has been read, ejection rollers 94 are stopped with the trailing end of the document P nipped. As the ejection rollers 94 are rotated backward, the document P is fed to a switchback path 95. The document P goes from the switchback path 95 toward an upstream side of the reading position X of the feed path 92. As a result, the leading end and the trailing end of the document P are reversed, and the document P is inverted.

Then, the document P is fed by the feed rollers 93, and the second surface of the document P is read by the image reading device when the document P passes the reading position X. When a sensor detects the trailing end of the document P, of which the second surface now has been read, the ejection rollers 94 are stopped again with the trailing end of the document P nipped, and then the document P is fed back to the switchback path 95. When the document P enters the feed path 92 again from the switchback path 95, its leading end and trailing end are reversed again, that is, the first surface faces the reading position X, and the document P is again inverted. The document P then is fed on the feed path 92 and ejected to an output tray 96 with its first surface facing downward. Thus, the first and second surfaces of the document P are read, and the document P is ejected to the output tray 96 in the same sequence as the original documents P, in the original order, placed on the input tray 90.

In the feed paths shown in FIG. 14, the feed path 92 and the switchback path 95 are arranged vertically above the reading position X requiring additional space above the reading position X thus increasing the size of the apparatus. In addition, a part of a document P being fed back may trail down onto the output tray 96, resulting in mixing up of the order of the stack of documents P already scanned and ejected onto the output tray 96.

In the feed paths of the document feeder shown in FIG. 14, guide members for guiding the document P to a specified feed path are disposed in a position where the switchback path 95 branches from the feed path 92, and a position where the switchback path 95 connects to the feed path 92. The guide members may be guide flaps capable of changing a path to the feed path 92 or a path where the feed path 92 and the switchback path 95 continue. The guide flaps are generally operated by a drive device such as a solenoid. Generally, the greater the number of guide members, the greater the number of drive devices is required, as well as additional space for the guide members and drive devices, and controls for each drive device.

SUMMARY

Aspects of the invention relate to a device having an automatic document feeder configured to feed document for double-sided reading, wherein the device is configured to guide a document to a desired path while avoiding contact with an ejected document, wherein the device has a small, simple structure, and can be manufactured at reasonable cost.

BRIEF DESCRIPTION OF THE DRAWINGS

Aspects of the invention will be described in detail with reference to various example structures and the following figures, wherein.

DETAILED DESCRIPTION

Illustrative aspects of the present invention will be described with suitable reference to the accompanying drawings. These aspects merely provide examples of the invention, and it is needless to say that the aspects can be suitably modified without departing from the gist of the invention.

Figure 1:
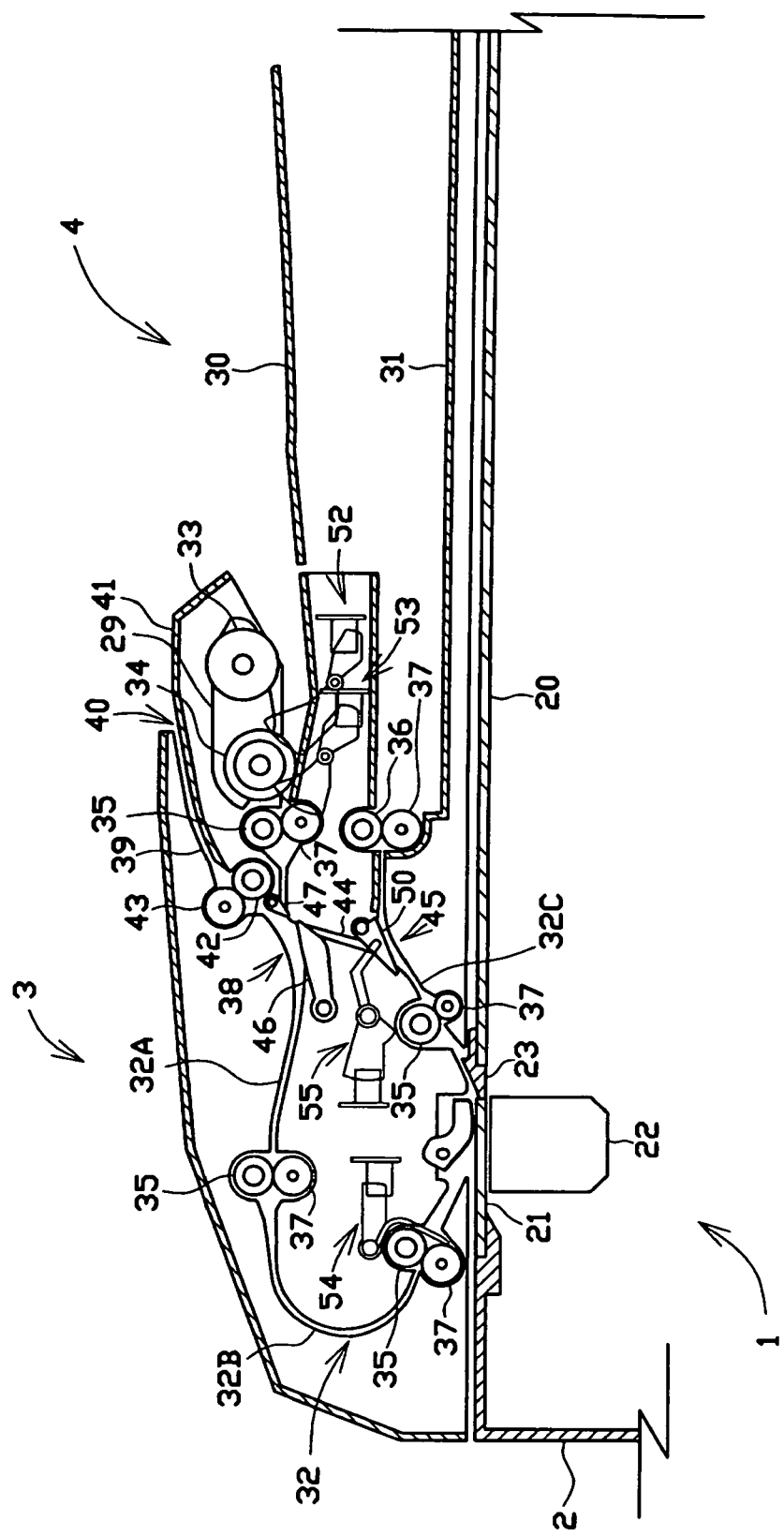
FIG. 1 is a side sectional view of an internal structure of an image reading apparatus 1 according to an illustrative embodiment of the invention.

FIG. 1 shows major internal structures of an image reading apparatus 1. The image reading apparatus 1 may be an image reader for reading documents, for example, for a copier, a facsimile, a scanner, a multi-function device (MFD), and the like.

As shown in FIG. 1, the image reading apparatus 1 is provided with a document mounting table 2 that functions as a flatbed scanner (FBS), and a document cover 4 including an auto document feeder 3 (ADF). The document cover 4 is attached to the document mounting table 2, and it may be opened and closed via hinges at the rear.

Platen glasses 20, 21 are disposed on the top of the document mounting table 2 where the document cover 4 faces. When the document cover 4 is opened, the platen glasses 20, 21 are exposed as the top surface of the document mounting table 2. When the document cover 4 is closed, the top surface of the document mounting table 2 including the platen glasses 20, 21 is completely covered. An image reading unit 22 is built into or otherwise associated with the document mounting table 2 so as to face the platen glasses 20, 21.

When the image reading apparatus 1 is used as an FBS, a document is placed on the platen glass 20. The platen glass 20 is formed of, for example, a transparent glass plate. An opening is formed in a center on the top of the document mounting table 2, and the platen glass 20 is exposed through the opening. An area where the platen glass 20 is exposed from the opening is a scan area in the FBS.

The platen glass 21 is at a reading or scanning position when the ADF 3 of the image reading apparatus 1 is used. The platen glass 21 is formed of, for example, a transparent glass plate. At the reading position of the document mounting table 2, an opening is formed, and the platen glass 21 is exposed from the opening. The platen glass 21 exposed from the opening extends back or in a depth direction of the image reading apparatus 1 in response to a length of the image reading unit 22 in a main reading direction.

A positioning member 23 is interposed between the platen glasses 20 and 21. The positioning member 23 of this example is a long flat plate extending back or in the depth direction of the image reading apparatus 1, e.g., to the same extent as the platen glass 21. The positioning member 23 may be used as a reference point for a document to be placed on the platen glass 20 in the FBS. Thus, the positioning member 23 may have, on its top surface, markings that indicate a center position and both side positions of various different document sizes, such as letter size, A4, and B5. The positioning member 23 also may formed with a guide surface, at its top surface, that catches and deflects the leading edge of a document moving along the platen glass 21 to thereby return the document to the ADF 3.

The image reading unit 22 is an image sensor that emits light onto a document from a light source via the platen glasses 20 and 21, focuses the light reflected from the document into a photoreceptor and converts the reflected light into electric signals. As the image reading unit 22, contact image sensors (CIS), charge coupled device (CCD) image sensors, and/or other desired types of image sensors may be used. The image reading unit 22 is provided below the platen glasses 20, 21 so as to be reciprocally movable, e.g., by a belt drive mechanism or the like, which is a scanning mechanism. For example, a driving force from a carriage motor may be transmitted to the image reading unit 22, and the image reading unit 22 then may be reciprocally moved in parallel with the platen glasses 20, 21.

The document cover 4 is provided with the ADF 3 that successively feeds documents from an input tray 30 (document placing portion) to an output tray 31 (document ejection portion) via a document feed path 32. During the feeding process by the ADF 3, while a document passes over the platen glass 21, which is the reading position, the image reading unit 22 provided under the platen glass 22 scans images on the document.

As shown in FIG. 1, the document cover 4 is provided with the input tray 30 and the output tray 31, which are vertically arranged in this example structure so that the input tray 30 is placed over the output tray 31. A document being read by the ADF 3 is placed on the input tray 30. If desired, a stack of documents to be read may be placed on the input tray 30 with their first sides facing upward and their leading edges inserted into the document feed path 32.

The output tray 31 in this example structure is disposed under the input tray 30 vertically away therefrom, and the output tray 31 is integrally formed with the top surface of the document cover 4. A document that has undergone a reading process is ejected from the ADF 3 and maintained separate from a stack of documents (if any) on the input tray 30 and is held on the output tray 31 with its first surface facing down.

As shown in FIG. 1, the document feed path 32, which has substantially a horizontal "U" shape in vertical sectional view, is formed inside the ADF 3 so as to connect the input tray 30 and the output tray 31 via the reading position on the platen glass 21. The document feed path 32 is continuously formed of various structural members forming an ADF frame 26, guide plates, and guide ribs, and the feed path 32 has a width where a document can pass. The input tray 30 and the output tray 31 are vertically arranged and the document feed path 32 is formed to connect the trays in substantially a horizontal "U" shape in vertical sectional view. With this structure, the ADF 3 is decreased in width and consequently reduced in overall size compared to prior art apparatus.

The document feed path 32 includes transfer elements for feeding the document. As shown in FIG. 1, the transfer elements are a pickup roller 33, a separation roller 34, feeding rollers 35 and pinch rollers 37, which are pressed into contact with the feeding rollers 35. The structure of each roller of the transfer elements shown are merely illustrative. The number of rollers and the arrangement of rollers may be modified within the skill of the art and other known transfer elements may be used.

As shown in FIG. 1, the pickup roller 33 and the separation roller 34 are disposed near a most upstream side of the document feed path 32. The pickup roller 33 is rotatably provided at an end portion of an arm 29, which is provided coaxially with a shaft of the separation roller 34. The separation roller 34 is rotatably provided at a downstream side of the pickup roller 33 in the sheet feeding direction so as to contact an opposing surface of the document feed path 32. A driving force is transmitted from a motor to the pickup roller 33 and the separation roller 34, which are rotatably driven. The driving force from the motor is further transmitted to the arm 29, which is vertically moved. The pickup roller 33 and the separation roller 34 generally are identical in diameter size, and they are driven at the same peripheral velocity. A separation pad may be disposed at an opposite position of the separation roller 34 to press into contact with a roller surface of the separation roller 34 and separate documents by friction.

The document feed path 32 has the horizontal "U" shape, which extends from the input tray 30 to one end of the document cover 4 (to the left in FIG. 1), curves downward so as to reverse its feeding direction, reaches the reading point on the platen glass 21, and extends from the reading position to the output tray 31. The document feed path 32 is mainly made up of three portions: an upper portion 32A, a curved portion 32B, and a lower portion 32C. The upper portion 32A and the lower portion 32C are upper and lower straight portions in the "U" shape, and the curved portion 32B is curved to continuously connect the upper portion 32A and the lower portion 32C. The document feed path 32 is used for both single-side reading and double-sided reading of a document using the ADF 3.

The feeding rollers 35 are disposed in specified positions on the document feed path 32. In the illustrative embodiment, the feed rollers 35 are disposed in the following four positions: in a directly downstream side from the separation roller 34; in the upper portion 32A of the document feed path 32; in the lower portion 32C of the document feed path 32 and directly upstream from the reading position; and in the lower portion 32C of the document feed path 32 and directly downstream from the reading position. The arrangement of the feeding rollers is just an example, and may be changed appropriately. The feeding rollers 35 are rotatably driven by power transmitted from the motor.

The pinch rollers 37 are provided to face their respective feeding rollers 35. Each pinch roller 37 is elastically urged (e.g., by a spring) and is pressed in contact with the roller surface of its respective feeding roller 35. When each feeding roller 35 is rotated, its respective pinch roller 37 is also rotated. In this manner, a document is pressed in contact with each feeding roller 35, and a rotational force thereof is transmitted to convey or move the document.

The ejection roller 36 is disposed near a most downstream side of the document feed path 32. As is the case with the feed rollers 35, a driving force from the motor is transmitted to the ejection roller 36 and the ejection roller 36 is rotated. A pinch roller 37 is also disposed to face the ejection roller 36, and this pinch roller 37 is elastically urged by a spring and pressed in contact with the ejection roller 36.

A bidirectional feed path 39 (also called a "switchback" path) is connected to the upper portion 32A on the document feed path 32. The bidirectional feed path 39 is used for double-sided reading, and it is designed to reverse the leading end and the trailing end of a document whose first surface has been scanned and to resend the document to the document feed path 32. The bidirectional feed path 39 is connected to a connection position 38 of the upper portion 32A, which is disposed on an upstream side of the reading position, and extends diagonally upward from the connection position 38 to the input tray 30. As the bidirectional feed path 39 is disposed diagonally upward from the connection position 38 to the input tray 30, space above the input tray 30 can be used effectively.

A termination 40 of the bidirectional feed path 39 is opened toward the top surface of the ADF 3. The length of the bidirectional feed path 39 is shorter than the length of the maximum sized document, at least where double-sided reading is desired. Thus, a document going into the bidirectional feed path 39 partially protrudes from the termination 40 outside the ADF 3. That is, the length of the bidirectional feed path 39 may not be longer than the length of the maximum sized document, at least where double-sided reading is desired.

A document supporting portion 41 is formed continuously from the termination 40 of the bidirectional feed path 39 to the input tray 30. The document supporting portion 41 is designed to support the document ejected from the termination 40 of the bidirectional feed path 39, and to form a housing of the ADF 3 above the pickup roller 33 and the separation roller 34. The housing of the ADF 3 is formed to cover the pickup roller 33 and the separation roller 34. The document supporting portion 41, which is part of the housing, extends from the termination 40 over the pickup roller 43 toward the input tray 30. Thus, in double-sided reading, a document, which enters the bidirectional feed path 39 and projects outside of the ADF 3 from the termination 40 will not trail down to the downstream side of the pickup position of the documents placed on the input tray 30, thereby preventing the documents from being jumbled or disordered at the pickup position.

A bidirectional feed roller 42 is disposed in the bidirectional feed path 39. As a driving force is transmitted from a motor to the bidirectional feed roller 42, the bidirectional feed roller 42 is rotated in both the forward and reverse directions. Facing the bidirectional feed roller 42, a pinch roller 43 is disposed. The pinch roller 43 is elastically urged, e.g., by a spring at its shaft, to be pressed in contact with a roller surface of the bidirectional feed roller 42, and is rotated following the rotation of the bidirectional feed roller 42. The document is pressed against the bidirectional feed roller 42 by the pinch roller 43, and rotation of the bidirectional feed roller 42 is transmitted to the document. The bidirectional feed roller 42 and the pinch roller 43 function as a bidirectional feeding member that feeds a document in two directions.

A bypass 44 is formed on a downstream side of the reading position in the lower portion 32C of the document feed path 32. The bypass 44 is configured to guide a document whose first surface has been read at the reading position, to the bidirectional feed path 39 in double-sided reading. The bypass 44 diverges from a branch position 45, which is on the downstream side of the reading position in the lower portion 32C of the document feed path 32, and extends diagonally upward to connect with the connection position 38. The connection position 38, which connects the bidirectional feed path 39 to the U-shaped document feed path 32, is disposed in the upper portion 32A of the document feed path 32. The branch position 45, in which the bypass 44 is diverged from the document feed path 32, is disposed in the lower portion 32C of the document feed path 32. Thus, the structure in the vicinity of the curved portion 32B can be simplified.

The feed path from the reading position of the document feed path 32 via the bypass 44 to the bidirectional feed path 39 is formed in the shape of an S in a vertical sectional view. With this shape, documents can be fed smoothly from the reading position of the document feed path 32 via the bypass 44 to the bidirectional feed path 39, and a paper jam can be prevented at the connection position 38 and the branch position 45. The feed path from the upper portion 32A, which is a straight portion of the U-shaped document feed path 32, via the connection position 38 to the bidirectional feed path 39 is also formed in the shape of an S in a vertical sectional view. With this shape, documents can be fed smoothly from the upper portion 32A of the document feed path 32 via the connection position 38 to the bidirectional feed path 39, and a paper jam can be prevented at the connection position 38.

A feed path is formed in a loop starting from the connection position 38 of the document feed path 32 via the reading position and the branch position 45 and reaching the connection position 38 again through the bypass 44. The length of the feed path is set longer than a length of a maximum size document, which is ready for double-side reading. For example, when the maximum size document is A4, its length is 297 mm. When the maximum size document is a letter size, its length is 11 inches. When the maximum size document is a legal size, its length is 14 inches. The length of the above feed path is set longer than these lengths. Thus, in double-side reading, when the leading end of a document passes the reading position and then enters the connection position 38, the trailing end of the document surely passes the connection position 38. Thus, a paper jam can be prevented at the connection position 38.

Figure 2:
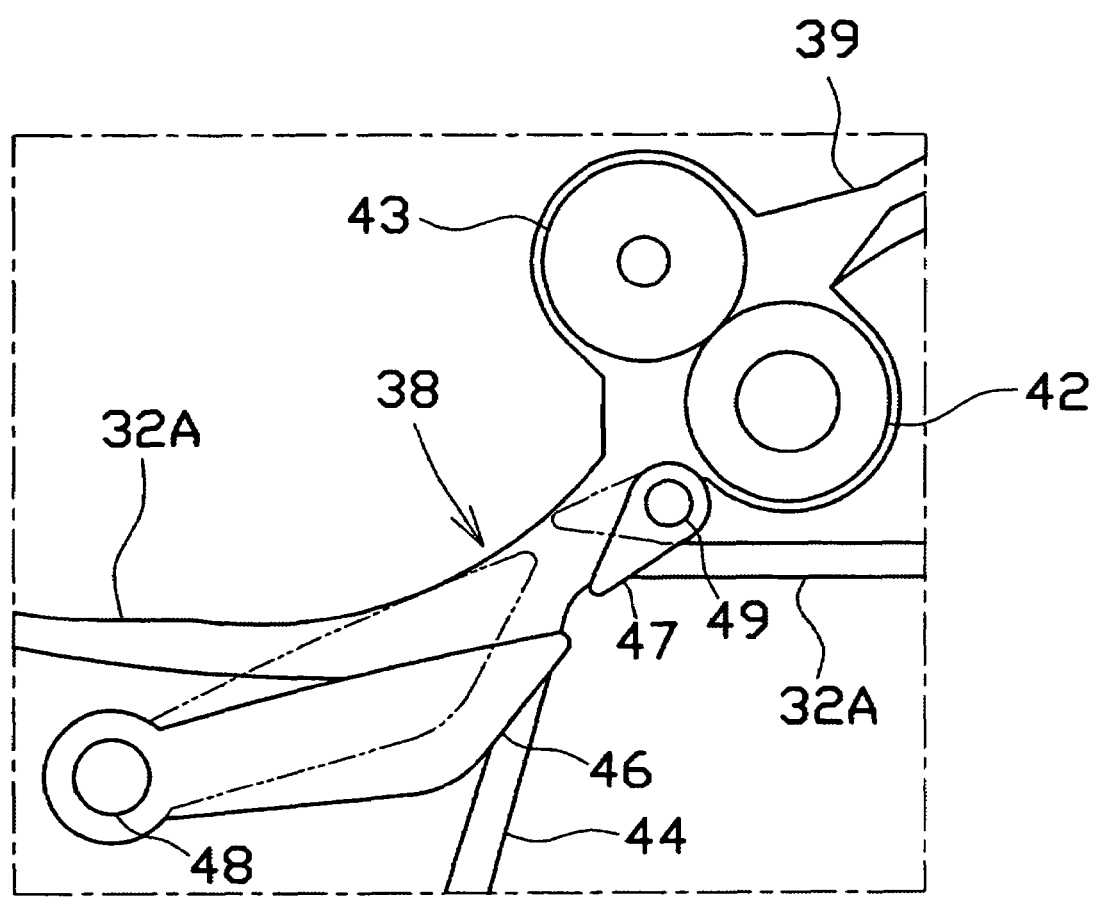
FIG. 2 is an enlarged view showing a structure at a connection position 38 according to at least one illustrative aspect of the invention.

As shown in FIGS. 1 and 2, guide flaps 46 (a first guide member) and 47 (a second guide member) for guiding the document to an appropriate feed path are disposed at the connection position 38. The guide flap 46 is pivotable in a specified range on a shaft 48, which is provided in a corner portion (lower left side of FIG. 2) in the connection position 38 where the reading position side of the document feed path 32 and the bypass 44 join. The guide flap 46 is a flat plate having generally a triangular (feather-like) shape, and its end projects to the connection position 38. Although only one guide flap 46 is shown in FIGS. 1 and 2, several guide flaps 46 may be provided at intervals along a width of the document feed path 32 if desired (a depth of the apparatus 1), and these multiple guide flaps 46 may be pivotable together with each other.

Figure 3:
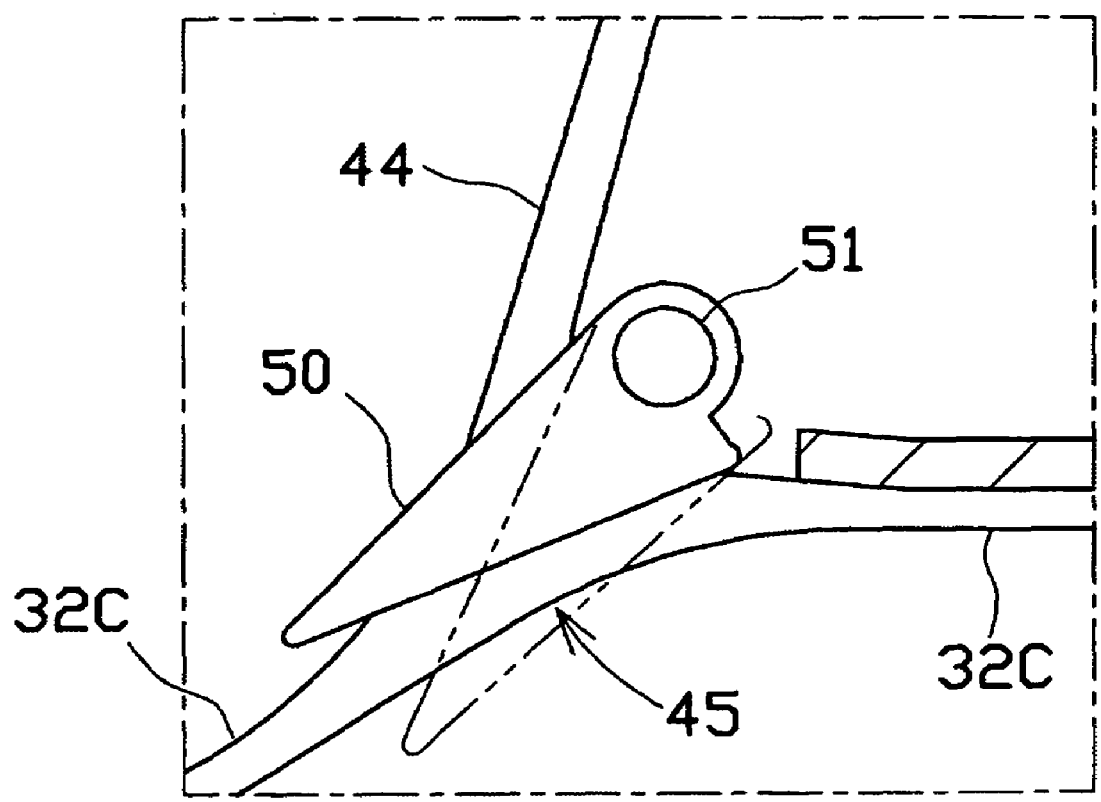
FIG. 3 is an enlarged view showing a structure at a branch position 45 according to at least one illustrative aspect of the invention.

The guide flap 46 pivots on the shaft 48 to change its position between a first guide position shown by a solid line in FIG. 2 and a second guide position shown by a double dotted line in FIG. 3. When the guide flap 46 is placed in the first guide position, the feed path continues from the input tray 30 (right side in the figure) to the reading position (left side in the figure), whereas a feed path from the document feed path 32 to the bypass 44 (down side in the figure) is closed. With this structure, a document that has reached the connection position 38 from the input tray 30 of the document feed path 32 is allowed to go to the reading position side of the document feed path 32, but not to the bypass 44. In addition, a document that has reached the connection position 38 from the bidirectional feed path 39 is allowed to go to the reading position of the document feed path 32, but not to the bypass 44.

When the guide flap 46 is placed in the second guide position, a feed path continues from the bypass 44 to the bidirectional feed path 39 (upper side in the figure), whereas a feed path from the bypass 44 to the document feed path 32 is closed. Thus, a document that has reached the connection position 38 from the bypass 44 is allowed to go to the bidirectional feed path 39, but not to the reading position side of the document feed path 32.

Switching the feed path by the guide flap 46 takes place when the document contacts the guide flap 46. The guide flap 46 is biased to be located at the first guide position shown by the solid line in FIG. 2, e.g., under its own weight or as a result of undergoing an urging force, such as from an elastic member such as a spring. When a document being fed upward in the bypass 44 comes in contact with the guide flap 46, the guide flap 46 is pivoted upward and placed in the second guide position shown by the double dotted line in FIG. 2. On the contrary, when a document is fed from the bidirectional feed path 39 to the connection position 38, the document comes in contact with the guide flap 46. However, as the guide flap 46 is set so that it does not move downward from the first guide position, the document is guided by the guide flap 46 to the reading position via the upper portion 32A of the document feed path 32. The guide flap 46 may be formed in a shape that allows the guide flap 46 to easily change its position by contact with a document being fed from the bypass 44 to the connection position 38, and to guide the document being fed from the bidirectional feed path 39 to the connection position 38 toward the reading position side of the document feed path 32. As long as the guide flap 46 is designed to change its position by contact with the document, there is no need to apply power from the motor or other power source to the guide flap 46 for changing its position, and thus the guide flap 46 can be provided with simple structure.

The guide flap 47 is pivotable in a specified range on a shaft 49, which is provided at a corner portion (upper right side in FIG. 2) in the connection position 38 where the input tray 30 side of the document feed path 32 and the bidirectional feed path 39 join. The guide flap 47 is a flat plate having generally a triangular (feather-like) shape, and its end projects to the connection position 38. Although only one guide flap 47 is shown in FIGS. 1 and 2, if desired, several guide flaps 47 may be provided at intervals along a width of the document feed path 32 (a depth of the apparatus 1), and these multiple guide flaps 47 may be pivotable together with one another.

The guide flap 47 pivots on the shaft 49 to change its position between a third guide position shown by a solid line in FIG. 2 and a fourth guide position shown by a double dotted line in FIG. 2. When the guide flap 47 is placed in the third guide position, a feed path from the bidirectional feed path 39 to the reading position side of the document feed path 32 continues, whereas a feed path from the bidirectional feed path 39 to the input tray 30 side of the document feed path 32 is closed. As a result, a document that has reached the connection position 38 from the bidirectional feed path 39 is allowed to go to the reading position side of the document feed path 32, but not to the input tray 30 side. In addition, a document that has reached the connection position 38 from the bypass 44 is allowed to go to the bidirectional feed path 39, but not to the input tray 30 side of the document feed path 32.

When the guide flap 47 is placed in the fourth guide position, a feed path from the input tray 30 side of the document feed path 32 to the reading position side continues, whereas a feed path from the input tray 30 side of the document feed path 32 to the bidirectional feed path 39 is closed. As a result, a document that has reached the connection position 38 from the input tray 30 side of the document feed path 32 is allowed to go to the reading position side of the document feed path 32, but not to the bidirectional feed path 39.

Switching the feed path by the guide flap 47 takes place when a document contacts the guide flap 47. The guide flap 47 is biased so as to be located at the third position shown in FIG. 2, e.g., under its own weight or as a result of undergoing an urging force of an elastic member such as a spring. A document being fed from the input tray 30 side of the document feed path 32 comes in contact with the guide flap 47, so that the guide flap 47 is pivoted leftward and placed in the fourth guide position by the double dotted line in FIG. 2. On the contrary, if a document that has reached the connection position 38 from the bypass 44 comes in contact with the guide flap 47, the guide flap 47 does not move rightward from the third position. Thus, the document is guided by the guide flap 47 and goes to the bidirectional feed path 39. The guide flap 47 may be formed in a shape that allows the guide flap 47 to easily change its position by contact with a document being fed from the input tray 30 side of the document feed path 32 to the connection position 38, and to guide, toward the bidirectional feed path 39, the document being fed from the bypass 44 to the connection position 38. As long as the guide flap 47 is designed to change its position by contact with the document, there is no need to apply power from the motor or other power source to the guide flap 47 for changing its position, and thus the guide flap 47 can be provided with simple structure.

As shown in FIGS. 1 and 3, a guide flap 50 is disposed at a branch position 45. The guide flap 50 is disposed so that it can pivot on a shaft 51. When power is transmitted from a motor to the guide flap 50, the guide flap 50 moves between a position shown by a solid line in FIG. 3 and a position shown by a double dotted line in FIG. 3. When the guide flap 50 is placed in the position shown by the solid line, the document feed path 32 continues from the reading position side (left side in the figure) to the output tray 31 side (right side in the figure). Thus, a document passing the reading position is guided at the branch position 45 to go to the lower portion 32C of the document feed path 32 continuing toward the output tray 31. When the guide flap 50 is placed in the position shown by the double dotted line, the feed path from a downstream side of the reading position in the lower portion 32C of the document feed path 32 to the bypass 44 continues. By this path, the document that has passed the reading position is guided at the branch position 45 to go to the bypass 44. In this way, the guide flap 50 is disposed to guide the document at the branch position 45 to either the document feed path 32 or the bypass 44. Although only one guide flap 50 is shown in FIGS. 1 and 3, if desired, several guide flaps 50 may be provided at intervals along a width of the document feed path 32, and these multiple guide flaps 50 may be rotated together with each other.

As shown in FIG. 1, a plurality of sensors for detecting conveyance of a document may be provided along the document feed path 32 and the bypass 44. For example, the document feed path 32 includes a first front sensor 52 and a second front sensor 53 on upstream and downstream sides of the separation roller 34, respectively, and a rear sensor 54 on a directly upstream side of the reading position. The bypass 44 includes a bidirectional feed sensor 55. These sensors are so called optical sensors and have identical structures except for that their detection element shapes are different according to positions for detection. Thus, the following description will be made using the first front sensor and the second front sensor.

Figure 4:
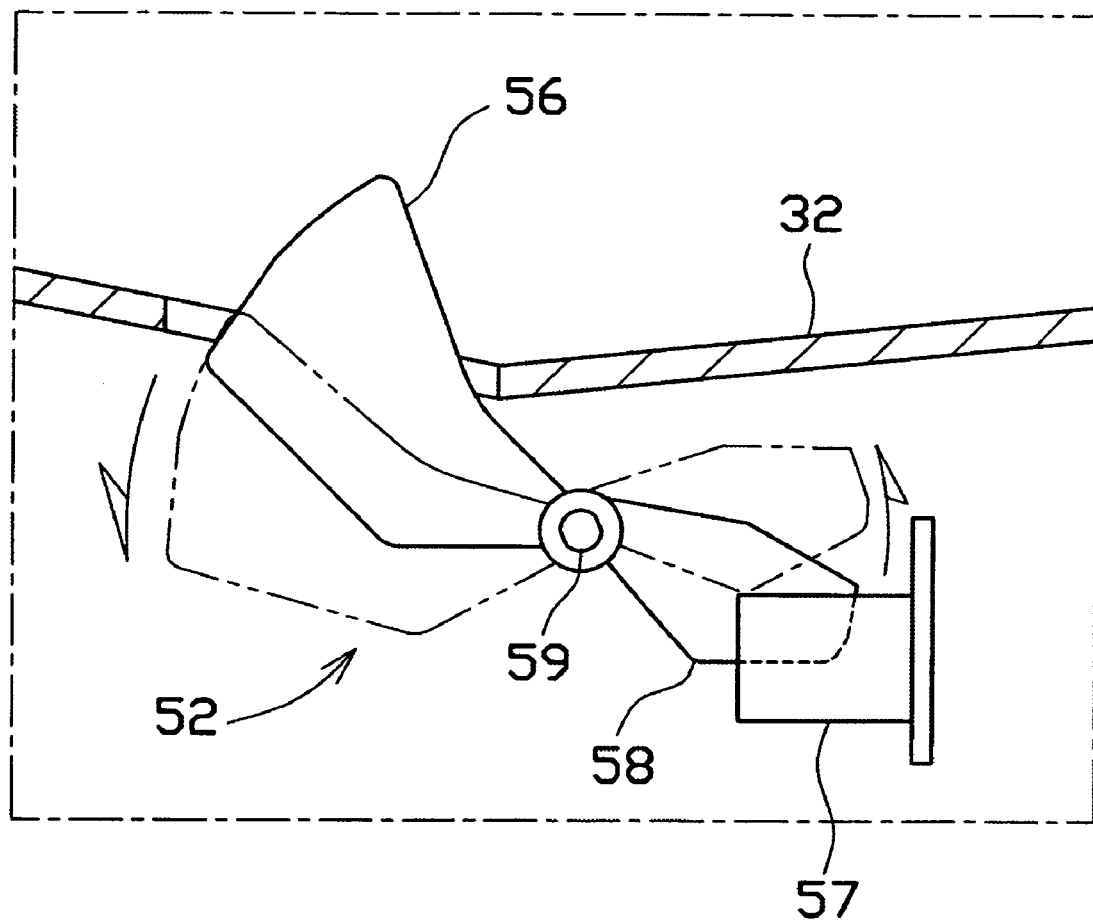
FIG. 4 is an enlarged view showing a structure of a first front sensor 52 according to at least one illustrative aspect of the invention.

As shown in FIG. 4, the first front sensor 52 includes a detection element 56 configured to protrude from underside of the document feed path 32 and rotate in contact with a document so as to withdraw from the document feed path 32, and a photo interrupter 57 configured to detect rotation of the detection element 56. The detection element 56 is integrally formed with a shield portion 58 that is detected by the photo interrupter 57. The detection element 56 is provided rotatably on a shaft 59. The detection element 56 is elastically urged by an urging member such as a spring into a position where the detection element 56 protrudes from the document feed path 32, that is, the detection element 56 is elastically urged counterclockwise in FIG. 4. When external force is not applied to the detection element 56, the detection element 56 protrudes from the document feed path 32 as shown by the solid line in FIG. 4, and the shield portion 58 is placed between a light emitting portion and a light receiving portion of the photo interrupter 57. Thus, light transmission from the photo interrupter 57 is interrupted, and the first front sensor 52 is turned off.

When a document is placed in the input tray 30, the document contacts the detection element 56, and the detection element 56 is rotated to withdraw from the document feed path 32. The shield portion 58 is also rotated along with the detection element 56, and separates from between the light emitting portion and the light receiving portion of the photo interrupter 57 as shown by the double dotted line in FIG. 4. Thus, light transmission of the photo interrupter 57 is not interrupted, and the first front sensor 52 is turned on. By on/off of the first front sensor 52, it is detected whether a document is placed in the input tray 30.

The second front sensor 53 is disposed directly downstream from the separation roller 34 and is configured to detect the leading or trailing end of the document fed in the document feed path 32 by on/off. For example, a determination whether the trailing end of a document has passed the connection position 38 is made by monitoring the number of rotations of the feed rollers 35, after the second front sensor 53 detects the trailing end of the document, e.g., with an encoder or the number of motor steps.

The rear sensor 54 is disposed directly upstream of the reading position and is configured to detect the leading or trailing end of a document fed in the document feed path 32 by on/off. A determination whether the leading or trailing end of the document has reached the reading position is made by monitoring the number of rotations of the feed rollers 35, after the rear sensor 54 detects the leading or trailing end of the document, e.g., with an encoder or the number of motor steps. Image reading by the image reading unit 22 is controlled based on a signal of the rear sensor 54. Image reading is started when the leading end of the document has reached the reading position, and it ends when the trailing end has reached the reading position.

The bidirectional feed sensor 55 is disposed in the bypass 44 and is configured to detect the leading or trailing end of the document fed in the bypass 44 by on/off. For example, a determination whether the trailing end of a document has passed the connection position 38 may be made by monitoring the number of rotations of the feed rollers 35 and the bidirectional feed roller 42, after the bidirectional feed sensor 55 detects the trailing end of the document, e.g., with an encoder or the number of motor steps.

The following will describe an example image reading operation of the image reading apparatus 1 according to the figures described above.

Although the image reading apparatus 1 can be used both as a FBS and with the ADF 3, detailed description of the FBS usage will be omitted because the FBS is not particularly related to this invention. Conventional operation of the system as a FBS may be used without departing from this invention. If the ADF 3 is used, the document cover 4 should be closed against the document mounting table 2. Opening and closing of the document cover 4 may be detected by a sensor provided on or with the document mounting table 2, and the document cover 4 may be controlled so that, when it is closed, the ADF 3 is available. The ADF cover 27 should be closed. A document G to be read is placed on the input tray 30. The document G is placed on the input tray 30 with a surface to be read (also called a "first surface") thereof face up. The document G may be one sheet or a stack of sheets. For example, when documents G of a given size are read, they may be stacked neatly on the input tray 30 with the first surface of each document G1 face up.

When a reading start is inputted in the image reading apparatus 1, the motor is driven, and the pickup roller 33, the separation roller 34, the feed rollers 35, the ejection roller 36, and the bidirectional feed roller 42 are rotated at their respective timings. When the arm 29 is lowered, the pickup roller 33 is pressed in contact with the document G on the input tray 30. Starting from the document G, which is placed in an uppermost position and is directly subjected to the rotation of the pickup roller 33 and the separation roller 34, the documents G are singly separated from the stack and fed into the document feed path 32. The picked up document G is guided into the document feed path 32 to go to the reading position, and read by the image reading unit 22 remaining at rest under the reading position. The read document G is ejected to the output tray 31. In this image reading operation, the feed path of the documents G is different between single-side reading and double-sided reading operations. Reading one side or both sides of the document G is determined in advance before the reading start is inputted.

Figure 5:
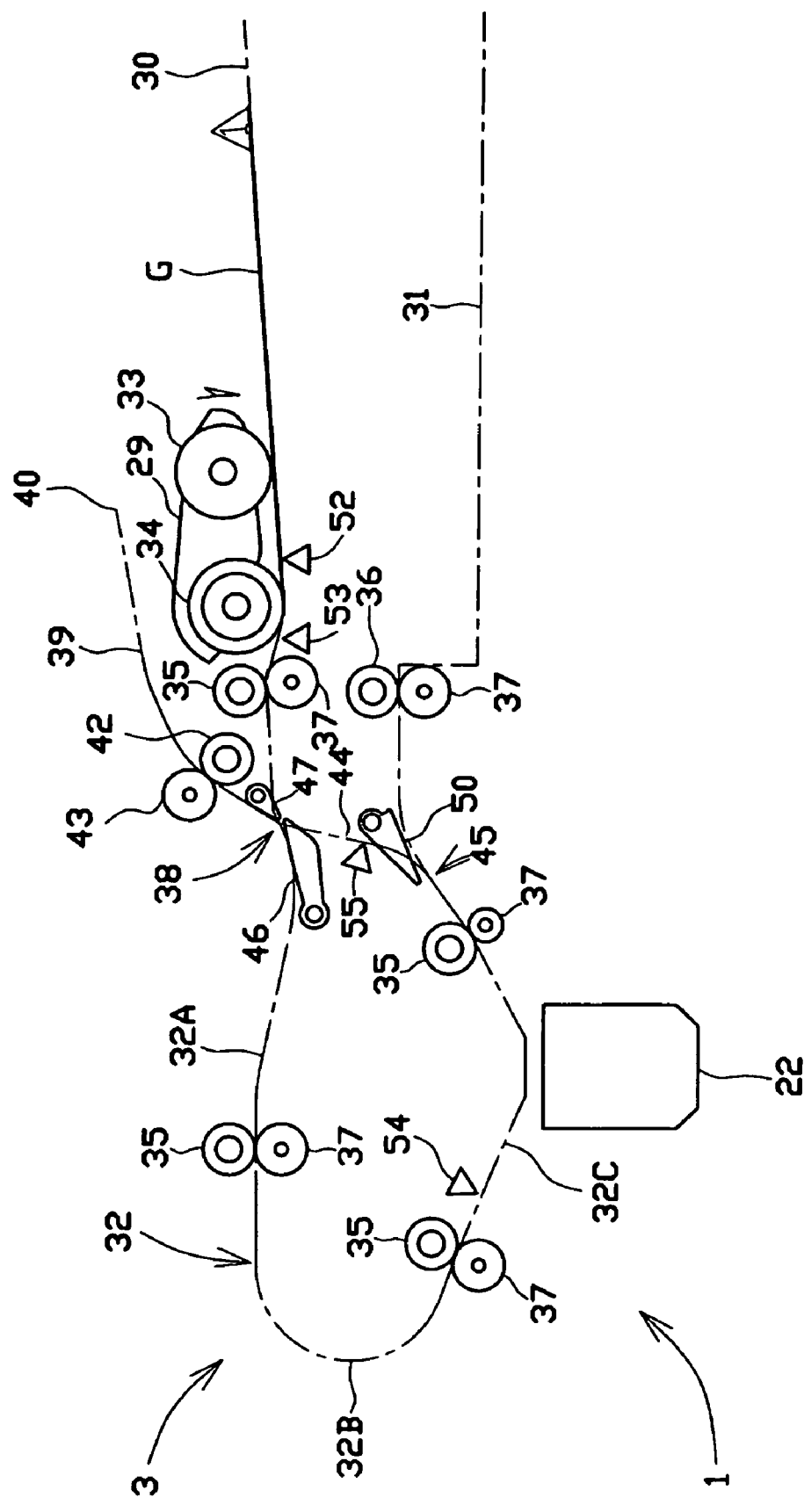
FIG. 5 schematically illustrates an image reading operation by the image reading apparatus 1 according to at least one illustrative aspect of the invention.

The single-side reading will be described. As shown in FIG. 5, the guide flap 50 is positioned at the branch position 45 so that the document feed path 32 continues from the reading position side to the output tray 31 side. The guide flap 46 is positioned in the first guide position when it does not contact with the document G. That is, the guide flap 46 is positioned at the connection position 38 so that the document feed path 32 continues from the input tray 30 side to the reading position side. The guide flap 47 is positioned in the third guide position when it does not contact with the document G. That is, the guide flap 47 is positioned at the connection position 38 so that the feed path continues from the bidirectional feed path 39 to the reading position side of the document feed path 32.

When the reading start is inputted into the image reading apparatus 1, the first front sensor 52 detects whether a document G is placed on the input tray 30. When no document G is placed on the input tray 30, an error message "no document" appears on a display portion of the image reading apparatus 1. When a document G is placed on the input tray 30, a driving force is transmitted from the motor to the arm 29, and the arm 29 is lowered. Then, the pickup roller 33 is pressed in contact with the document G on the input tray 30. When the pickup roller 33 and the separation roller 34 rotate, the document G is fed into the document feed path 32. When a stack of documents G is placed on the input tray 30, a document that is placed directly under the uppermost document G may be fed together therewith. However, the document is restrained by the separation pad provided opposing the separation roller 34.

In the document feed path 32, power is transmitted from the motor to the feed rollers 35 and the ejection roller 36, and each roller rotates so as to feed the document G from the upstream side of the document feed path 32 to the downstream side. The document G is picked up from the input tray 30, fed into the document feed path 32, nipped between the feed roller 35 and the pinch roller 37 in which the rotational force is transmitted to the document G, and fed to the connection position 38 of the document feed path 32.

Figure 6:
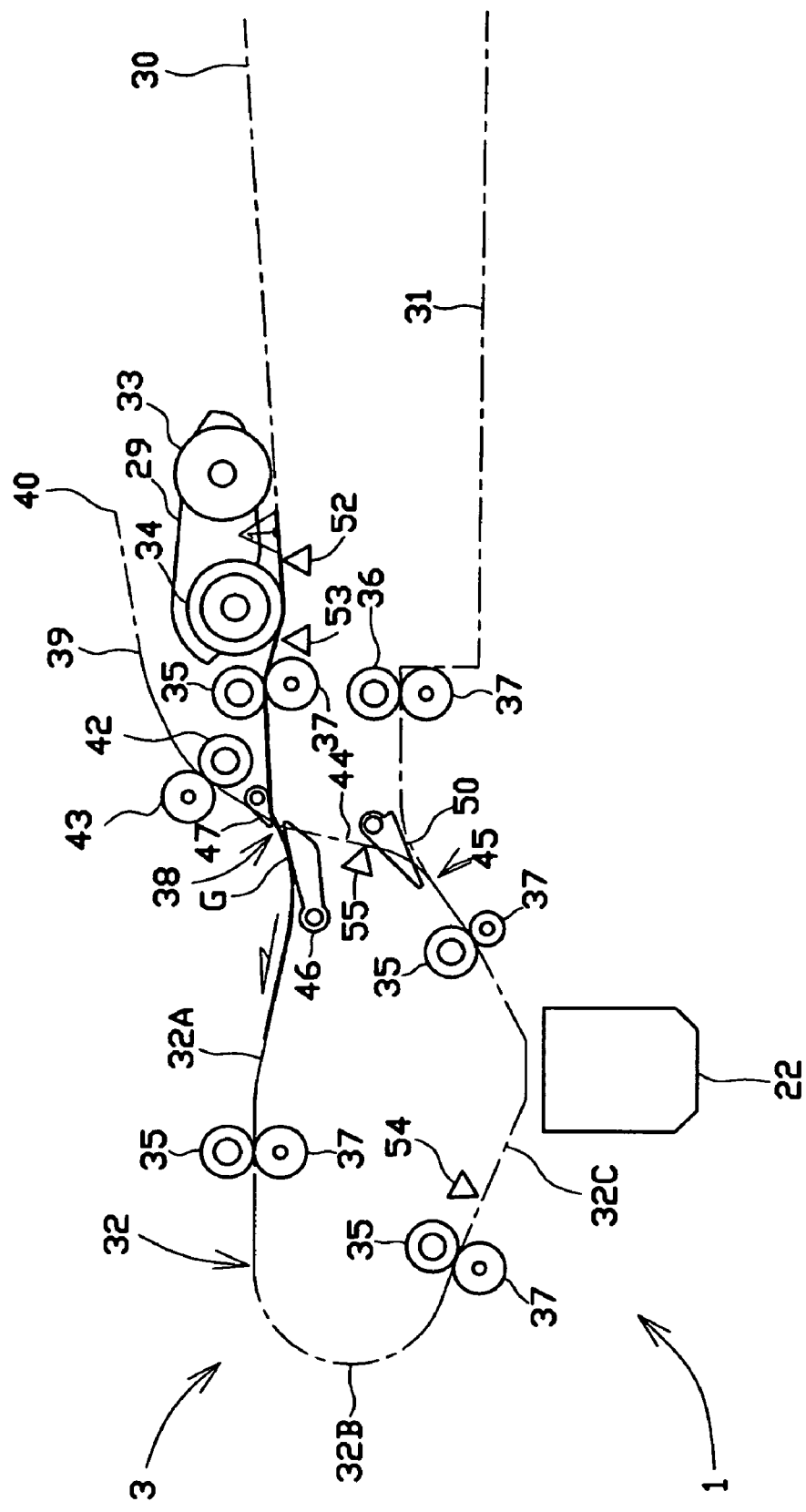
FIG. 6 schematically illustrates an image reading operation by the image reading apparatus 1 according to at least one illustrative aspect of the invention.

As the guide flap 47 closes the document feed path 32 from the input tray 30 side to the connection position 38, the document G being fed to the connection position 38 comes in contact with the guide flap 47. As shown in FIG. 6, the guide flap 47 is pushed by the document G being fed in the document feed path 32 and pivoted from the third guide position to the fourth guide position. As a result, the document feed path 32 continues from the input tray 30 to the reading position, whereas the path to the bidirectional feed path 39 is closed. In addition, the feed path to the bypass 44 is closed by the guide flap 46. As a result, the document G that has reached the connection position 38 from the input tray 30 side of the document feed path 32 is guided by the guide flaps 46, 47, and fed to the reading position of the document feed path 32, without going to the bidirectional feed path 39 or the bypass 44.

Figure 7:
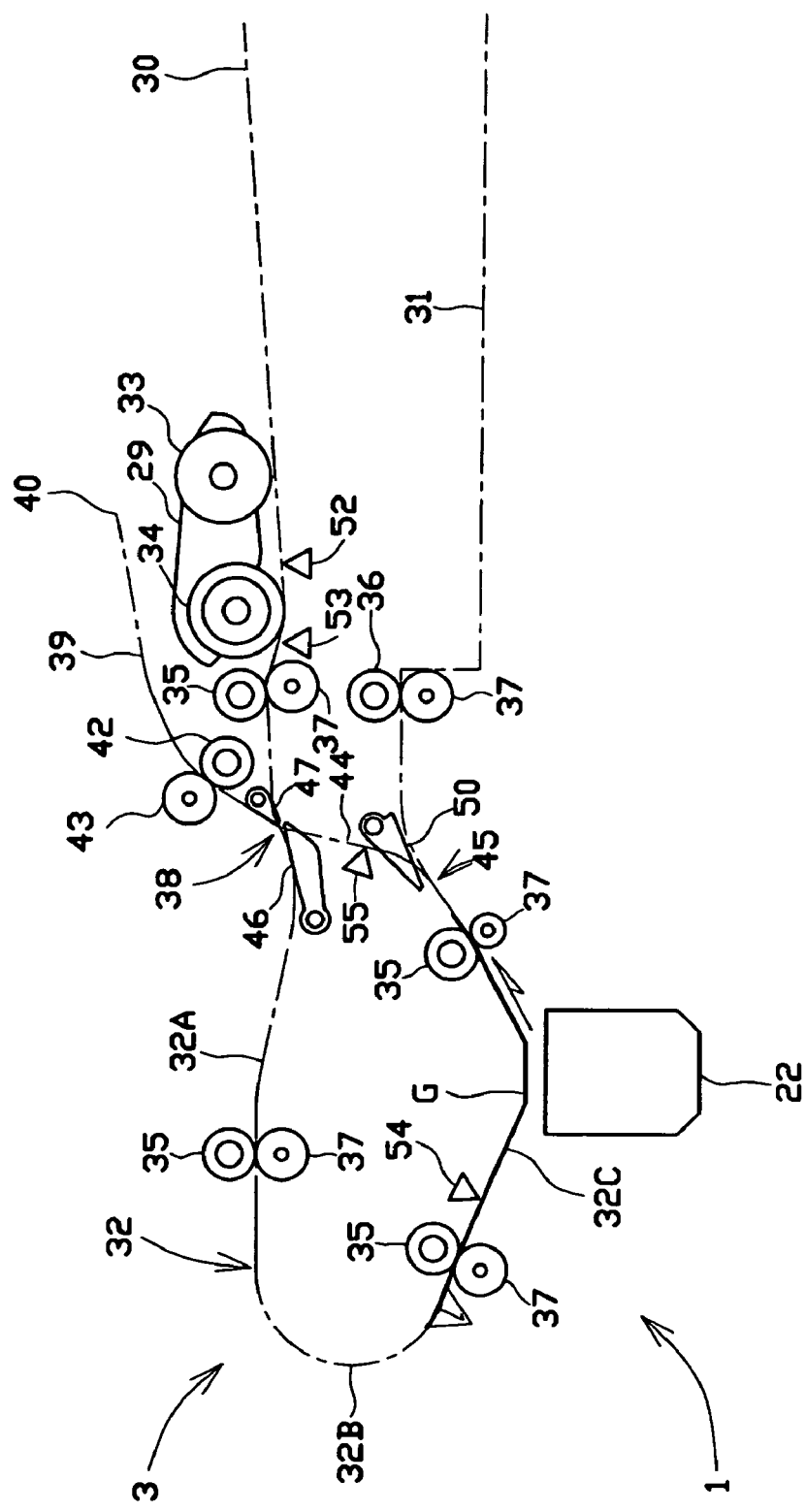
FIG. 7 schematically illustrates an image reading operation by the image reading apparatus 1 according to at least one illustrative aspect of the invention.

As shown in FIG. 7, the document G is inverted downward at the curved portion 32B, and the leading end of the document G is detected by the rear sensor 54. The leading end of the document G reaches the reading position when a fixed time passes after being detected by the rear sensor 54. When the leading end of the document G reaches the reading position, the image reading unit 22 starts image reading of the document G. The document G passes the reading position with the first surface opposing the image reading unit 22, and the image on the first surface of the document G is read by the image reading unit 22. The image reading unit 22 finishes image reading of the document G when a fixed time passes after the trailing end of the document G is detected by the rear sensor 54. When the trailing end of the document G passes the connection position 38, the guide flap 47 returns from the fourth guide position to the third guide position.

Figure 8:
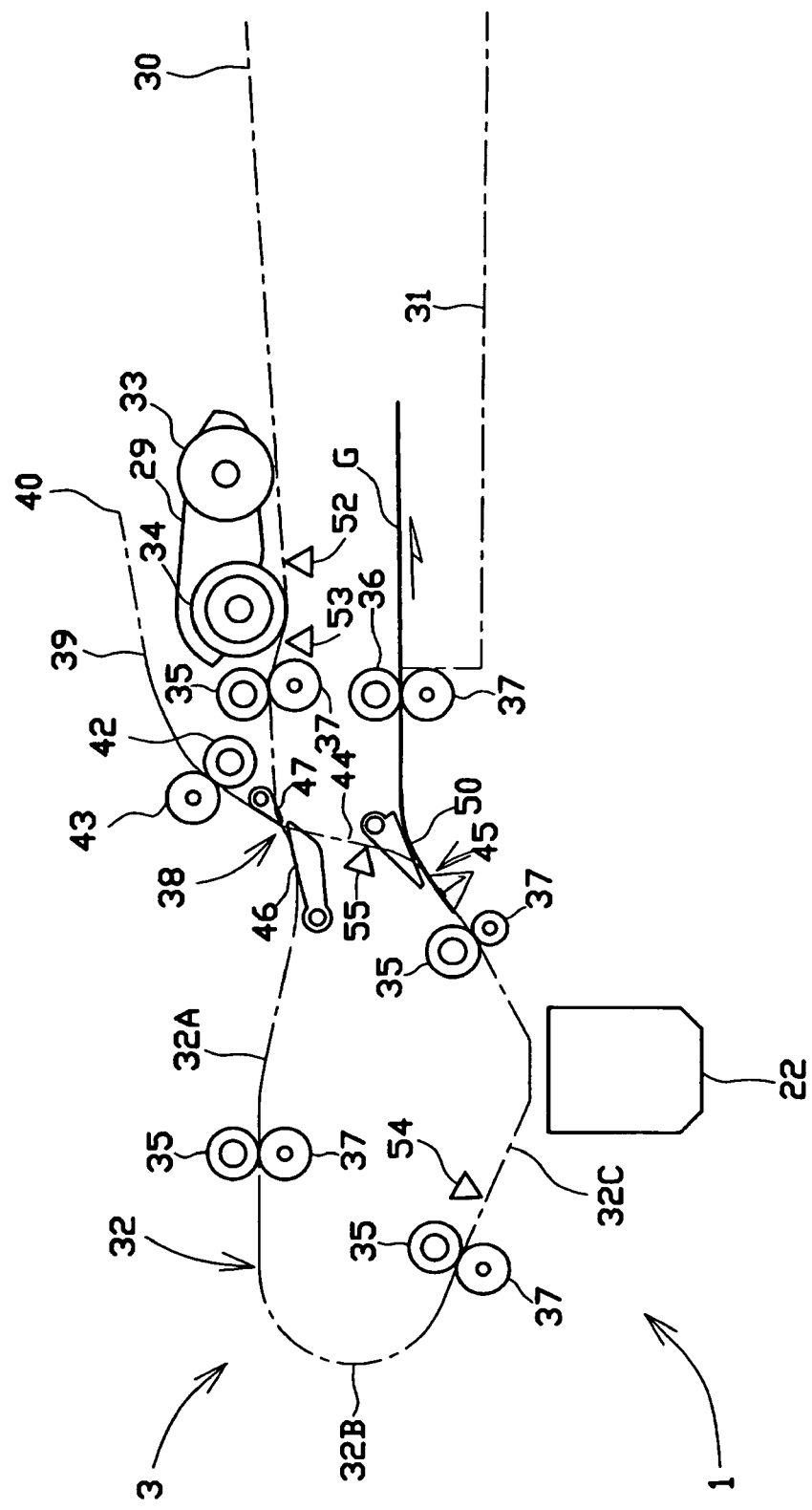
FIG. 8 schematically illustrates an image reading operation by the image reading apparatus 1 according to at least one illustrative aspect of the invention.

As shown in FIG. 8, the document G is guided at the branch position 45 by the guide flap 50 toward the output tray 31 side of the document feed path 32. The document G is nipped between the ejection roller 36 and the pinch roller 37, and then ejected from the document feed path 32 to the output tray 31. When the following document G is set on the input tray 30, it is singly picked up and fed from the input tray 30, and the single surface of the document G is read by repeating the above operations.

The following describes double-sided reading. Before the document G is fed, as shown in FIG. 5 in the description of single-side reading, the guide flap 50 is positioned at the branch position 45 so that document feed path 32 continues from the reading position to the output tray 31. The guide flap 46 is positioned in the first guide position. That is, the guide flap 46 is positioned at the connection position 38 so that the document feed path 32 continues from the input tray 30 side to the reading position side. The guide flap 47 is positioned in the third guide position. That is, the guide flap 47 is positioned at the connection position 38 so that the feed path continues from the bidirectional feed path 39 to the reading position side of the document feed path 32.

When the reading start is inputted into the image reading apparatus 1, as is the case with single-side reading, the first front sensor 52 detects whether a document G is placed on the input tray 30, the arm 29 is lowered, the pickup roller 33 and the separation roller 34 are rotated, and the document G is fed into the document feed path 32.

In the document feed path 32, the feed rollers 35 are rotated so as to feed the document G from the upstream side to the downstream side, the document G is fed from the input tray 30 to the document feed path 32 to go to the connection position 38. At the connection position 38, as shown in FIG. 6 in the description of single-side reading, the guide flap 47 is pushed by the document G being fed in the document feed path 32 and pivoted from the third guide position to the fourth guide position. As a result, the document feed path 32 continues from the input tray 30 to the reading position, whereas the path to the bidirectional feed path 39 is closed. In addition, the feed path to the bypass 44 is closed by the guide flap 46. As a result, the document G that has reached the connection position 38 from the input tray 30 side of the document feed path 32 is guided by the guide flaps 46, 47, and fed to the reading position of the document feed path 32, without going to the bidirectional feed path 39 or the bypass 44.

As shown in FIG. 7 in the description of single-side reading, the document G is inverted downward at the curved portion 32B, the leading end of the document G is detected by the rear sensor 54, and the image on the first surface of the document G is read by the image reading unit 22. The image reading unit 22 finishes image reading of the document G when a fixed time passes after the trailing end of the document G is detected by the rear sensor 54.

After the document G reaches between the connection position 38 of the document feed path 32 and the branch position 45, the guide flap 50 is changed so as to allow the feed path at the branch position 45 to continue from the reading position of the document feed path 32 to the bypass 44. Timing for the guide flap 50 to change the feed path is optional and may be set before the document G is fed. When the trailing end of the document G passes the connection position 38, the guide flap 47 returns from the fourth guide position to the third guide position.

Figure 9:
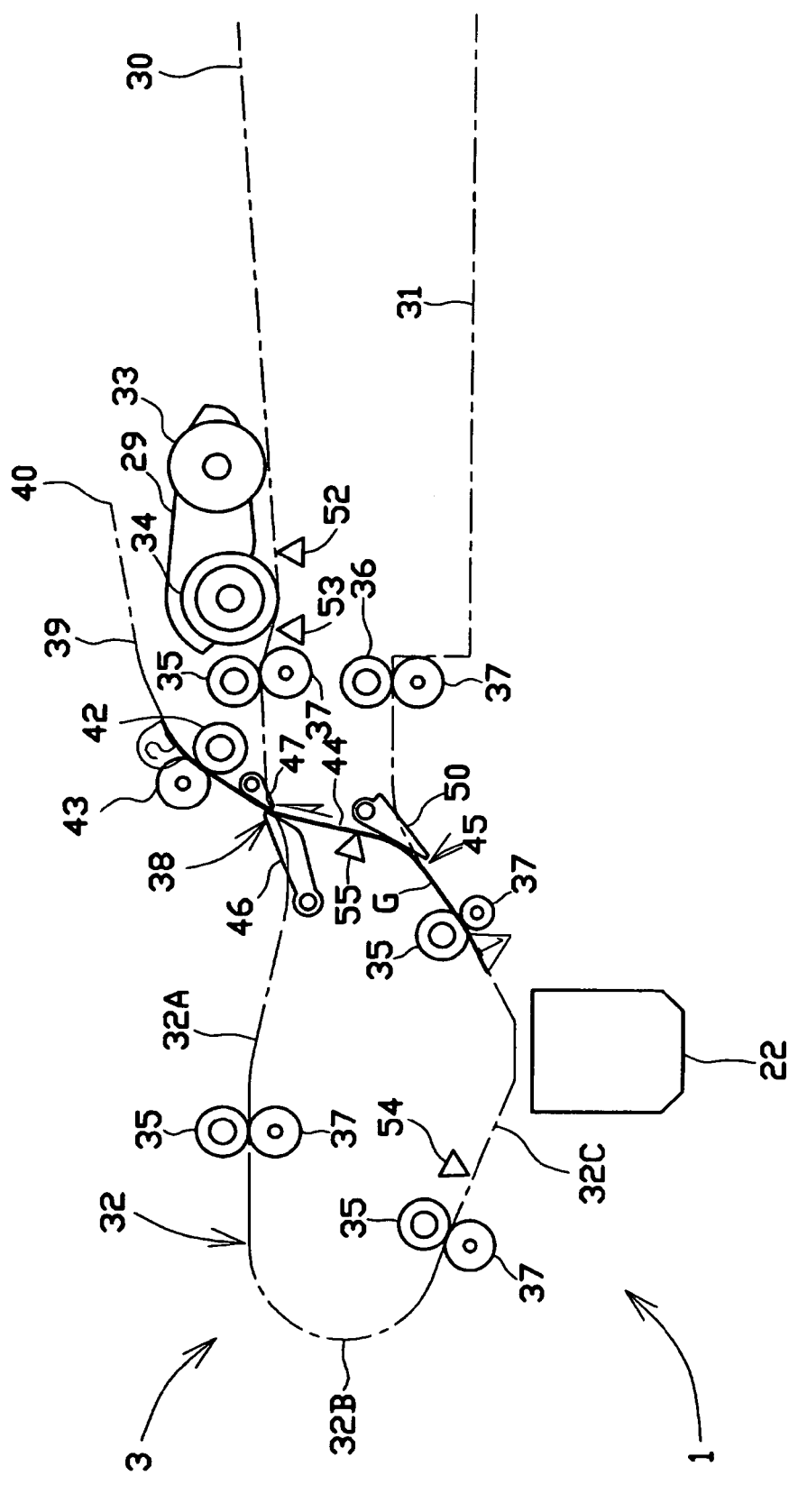
FIG. 9 schematically illustrates an image reading operation by the image reading apparatus 1 according to at least one illustrative aspect of the invention.

As shown in FIG. 9, the document G of which the first surface has been read is guided by the guide flap 50 to go to the bypass 44 at the branch position 45. As the guide flap 46 closes the feed path from the bypass 44 to the connection position 38, the document G entering the bypass 44 comes in contact with the guide flap 46 when it reaches the connection position 38. The guide flap 46 is pushed by the document G being fed in the bypass 44 and pivots upward from the first guide position to the second guide position as shown in FIG. 9. Thus, the feed path from the bypass 44 to the bidirectional feed path 39 continues, whereas the path to the reading position of document feed path 32 is closed. In addition, the feed path to the input tray 30 of the document feed path 32 is closed by the guide flap 47. As a result, the document G that has reached the connection position 38 from the bypass 44 is guided by the guide flaps 46, 47, and fed to the bidirectional feed path 39 without going to the document feed path 32. The document G is nipped between the bidirectional feed roller 42 and the pinch roller 43, and it is fed to the termination 40 on the bidirectional feed path 39 due to the rotation of the bidirectional feed roller 42. In figures, a surface of a document G indicated with the number "1" refers to the first surface of the document G, which is to be read first in the double-sided reading, and a surface indicated with the number "2" refers to the second surface of the document G, which is to be read next in the double-sided reading. The first surface and the second surface are the front side and back side, respectively, of the document G.

Figure 10:
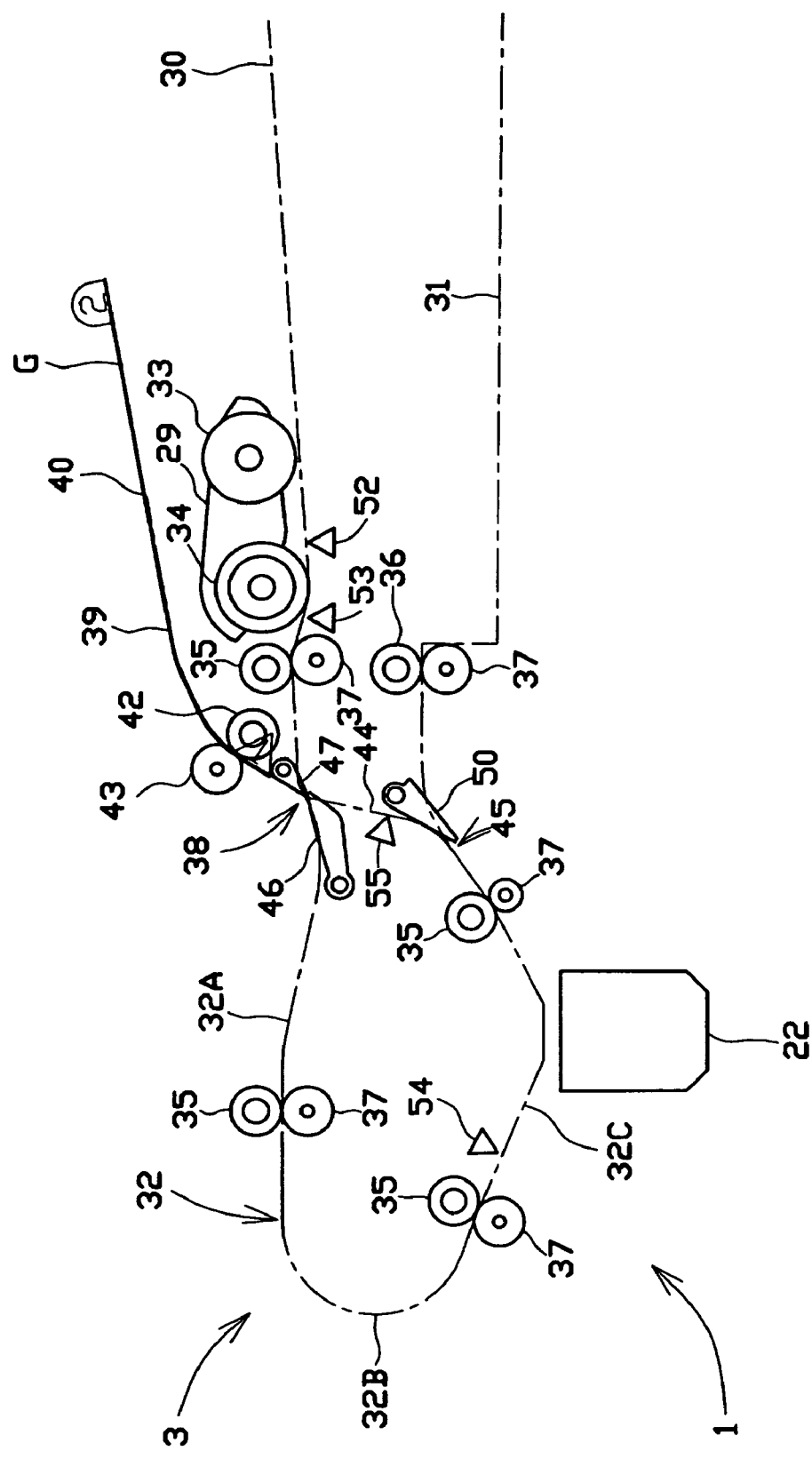
FIG. 10 schematically illustrates an image reading operation by the image reading apparatus 1 according to at least one illustrative aspect of the invention.

As shown in FIG. 10, after the document G completely goes to the bidirectional feed path 39, the bidirectional feed roller 42 is stopped. Specifically, the trailing end of the document G passes over the connection position 38 when a fixed time passes after the trailing end of the document G being fed in the bypass 44 is detected by the bidirectional feed sensor 55. Thus, it is determined that the document G completely enters the bidirectional feed path 39 by counting a detection signal by the bidirectional feed sensor 55, and a feeding length or time by the bidirectional feed roller 42. Then, the bidirectional feed roller 42 is stopped, and the document G is stopped while still remaining nipped between the bidirectional feed roller 42 and the pinch roller 43 as shown in FIG. 10. At this time, although a part of the document G protrudes from the termination 40 of the bidirectional feed path 39 outside of the ADF 3, it is supported by the document supporting portion 41.

As the document G passes over the connection position 38 and separates from the guide flap 46, the guide flap 46 pivots downward and returns to the first guide position. Then, the bidirectional feed roller 42 is rotated backward, so that the document G is fed back to the connection position 38 on the bidirectional feed path 39.

Figure 11:
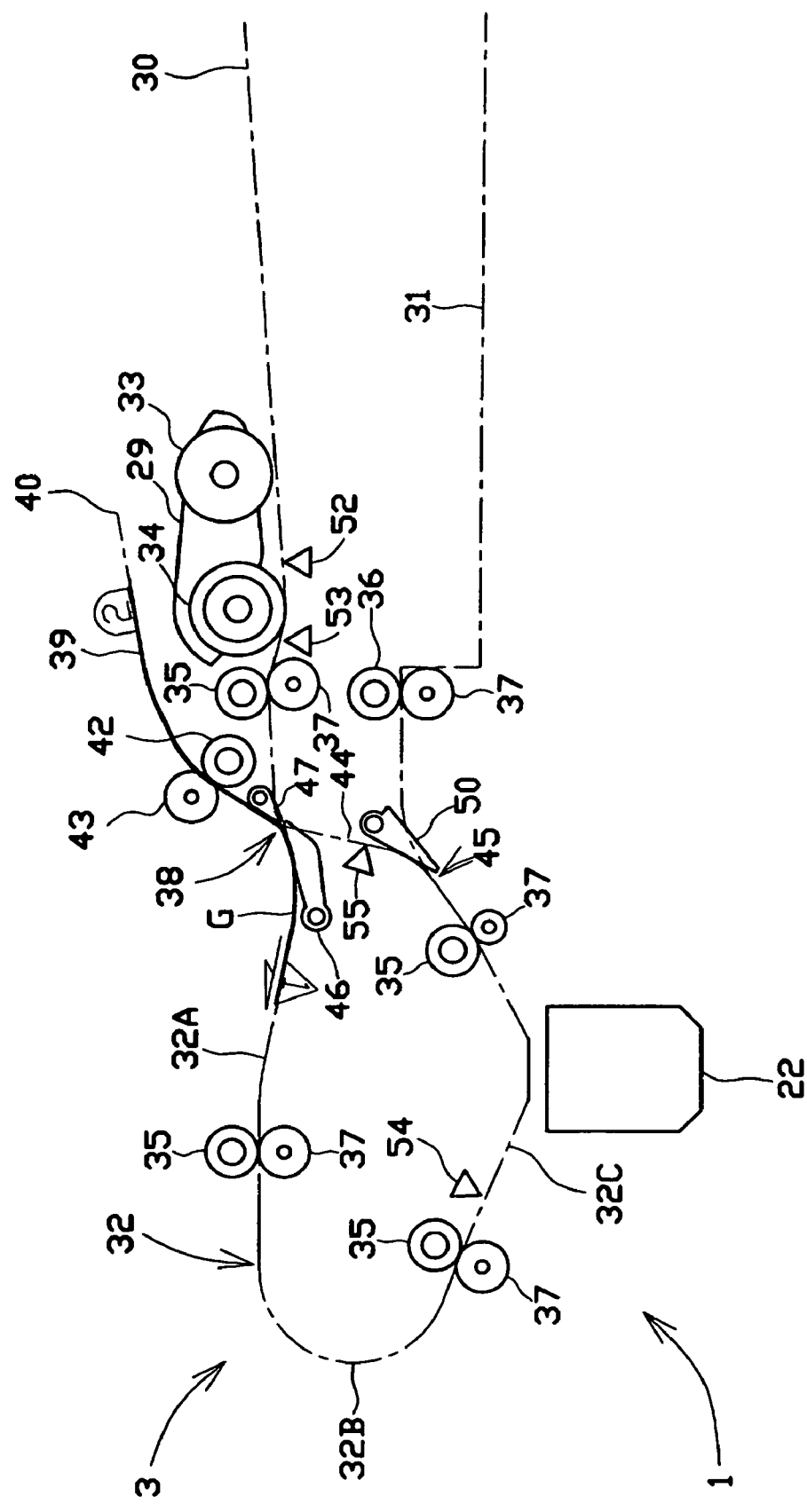
FIG. 11 schematically illustrates an image reading operation by the image reading apparatus 1 according to at least one illustrative aspect of the invention.

As shown in FIG. 11, the document G being fed back from the bidirectional feed path 39 comes in contact with the guide flap 46 at the connection position 38. The guide flap 46 does not move downward from the first guide position. Thus, the feed path from the bidirectional feed path 39 to the reading position of the document feed path 32 continues, whereas the path to the bypass 44 is closed. The guide flap 47 closes the feed path to the input tray 30 side of the document feed path 32. As a result, the document G is guided by the guide flaps 46 and 47, and fed from the bidirectional feed path 39 to the reading position of the document feed path 32, without going to the bypass 44 or to the input tray 30 side of the document feed path 32. When the document G is fed back to the upstream side of the reading position of the document feed path 32 from the bidirectional feed path 39, it is fed again to the document feed path 32 with its leading end and trailing end reversed as compared with the condition where the document G was first fed into the document feed path 32. In this way, the document G is fed back. The document G is fed into the document feed path 32 with its second surface facing the reading position.

Figure 12:
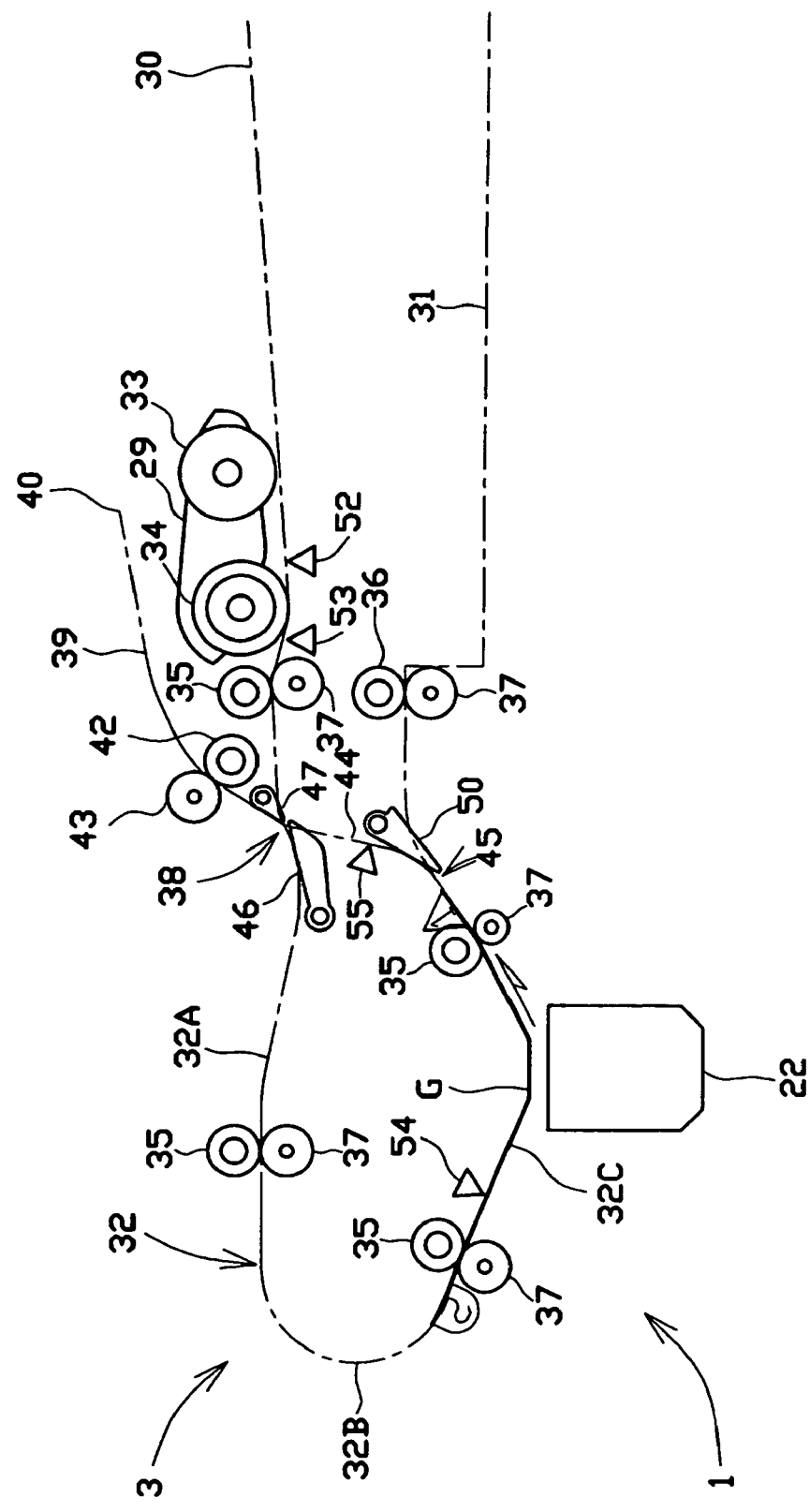
FIG. 12 schematically illustrates an image reading operation by the image reading apparatus 1 according to at least one illustrative aspect of the invention.

As shown in FIG. 12, when the leading end of the document G is detected by the rear sensor 54 and reaches the reading position, the image reading unit 22 starts image reading of the second surface of the document G. The document G of which the second surface has been read then is guided by the guide flap 50, and it enters the bypass 44 from the document feed path 32 at the branch position 45. When the trailing end of the document G is detected by the rear sensor 54 and reaches the reading position, the image reading unit 22 finishes image reading of the document G.

The document G entering the bypass 44 pushes the guide flap 46 upward to change its position from the first guide position to the second guide position as is the case with FIG. 9, and the document G goes to the bidirectional feed path 39 from the bypass 44 at the connection position 38. As is the case with FIG. 10, after the document G completely goes to the bidirectional feed path 39, the bidirectional feed roller 42 stops. The guide flap 46 returns to the first guide position from the second guide position when the document G passes. Then, the bidirectional feed roller 42 is rotated backward, the document G is fed back to the document feed path 32 from the bidirectional feed path 39, as is the case with FIG. 11, with its leading end and trailing end reversed again.

After the document G reaches between the connection position 38 and the branch position 45 of the document feed path 32, the guide flap 50 switches the feed path at the branch position 45 from the reading position side of the document feed path 32 to the output tray 31 side. Thus, as is the case with FIG. 8, the document G is guided at the branch position 45 by the guide flap 50 to go to the output tray 31 side of the document feed path 32, and is ejected to the output tray 31 with its first surface face down. When the following document G is set on the input tray 30, it is singly picked up and fed from the input tray 30, and image reading of both surfaces of the document G is performed by repeating the above operations. As documents G are sequentially ejected to the output tray 31 with their first surface face down, the order of the documents G placed on the input tray 30 is maintained on the output tray 31.

In this illustrative embodiment, double-sided reading by the image reading apparatus 1 has been described based on the assumption that the user desires the documents G placed on the input tray 30 to be ejected to the output tray 31 in an orderly sequence. However, if there is no need to match the sequence of the documents G placed on the input tray 30 to the sequence of the documents G ejected to the output tray 31, the documents G may be fed to the reading position with their second surface facing the reading position, fed not to the bypass 44, but rather to the output tray 31 at the branch position 45, and then ejected to the output tray 31. With this structure and arrangement, whereas the sequence of the documents G is not maintained at the output tray 31, the last operation, feeding back the documents for the second inversion process, can be eliminated, and the time taken for double-sided reading of the documents G can be reduced.

According to the ADF 3 of the image reading apparatus 1, at the connection position 38, when the guide flap 46 is in the first guide position and the guide flap 47 is in the fourth guide position, the document G being fed from the input tray 30 to the connection position 38 is guided to the reading position of the feed document path 32. In addition, at the connection position 38, when the guide flap 46 is in the second guide position and the flap guide 47 is in the third position, the document being fed from the bypass 44 to the connection position 38 is guided to the bidirectional feed path 39. At the connection position 38, when the guide flap 46 is in the first guide position and the guide flap 47 is in the third guide position, the document being fed back to the connection position 38 from the bidirectional feed path 39 is guided to the reading position of the document feed path 32. Thus, the document G can be guided in a desired direction using the two kinds of guide flaps 46 and 47 at the connection position 38 where the document feed path 32, the bidirectional feed path 39, and the bypass 44 join.

To independently open and close all feed paths leading to the connection position 38 by guide members, the guide members should be individually disposed in the feed paths. However, as the number of guide members increases, the number of drive devices (such as solenoids) for the guide members increases, so that the entire cost of the apparatus will rise. In addition, space is required for each guide member and its corresponding drive device increasing the size of the apparatus. Furthermore, each drive device is typically independently controlled to guide the document to a desired feed path, which becomes complicated.

According to the ADF 3 of the image reading apparatus 1, as the two types of guide flaps 46 and 47 are used, the document G being fed to the connection position 38 can be guided to a desired feed path with a simple and effective structure, without a need to use a drive device such as a solenoid.

According to the image reading apparatus 1, the bidirectional feed path 39, which is configured to feed the document G of which the first or second surface has been read to the document feed path 32 again, is formed to connect with the connection position 38, which is on an upstream side of the reading position of the document feed path 32. The bypass 44, which is configured to guide the document G of which the first or second surface has been read from the document feed path 32 to the bidirectional feed path 39, is formed to branch off at the branch position 45, which is on a downstream side of the reading position of the document feed path 32, and to connect with the connection position 38. Thus, there is no need to form a plurality of feed paths in the vicinity of the curved portion 32B that is bent in substantially U-shape in the document feed path 32. With this structure, the apparatus can be lowered in height, reducing the overall size. In addition, the document G protruding from the termination 40 of the bidirectional feed path 39 will not mix up documents G placed on the output tray 31.

The feed direction of the document of which the first surface has been read is inverted by the bidirectional feed roller 42, so that the document is fed again to the upper portion 32A of the document feed path 32 with its trailing end being in the lead. The feeding roller 35 and the pinch roller 37, which are disposed in the upper portion 32A, reduce the skew of the document being fed in a horizontal area of the document feed path 32. Thus, the skew of the document can be reduced when the second surface of the document is read.

In the illustrative embodiment, the guide flaps 46, 47 are used as a first guide member and a second guide member. Instead, elastically deformable films or other devices may be used as the first and second guide members.

Figure 13:
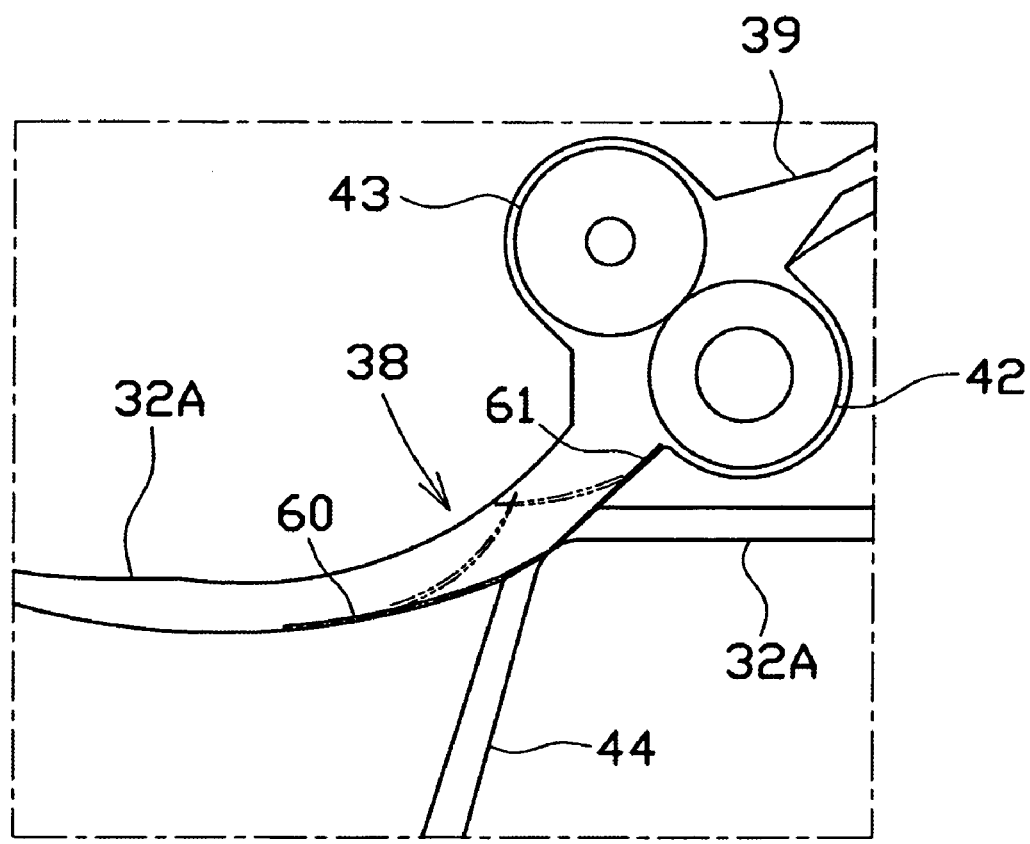
FIG. 13 is an enlarged view showing guide films 60 and 61 according to a another illustrative embodiment of the invention.
Figure 14:
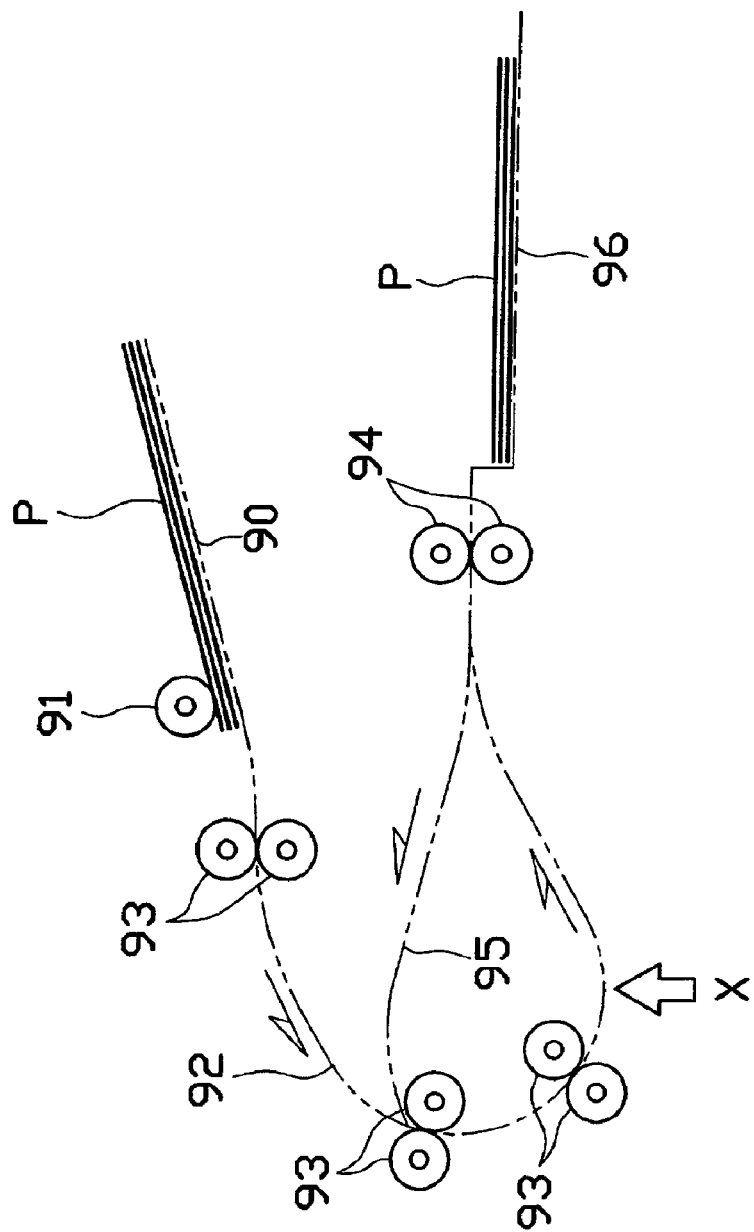
FIG. 14 schematically illustrates a structure of a related-art automatic document feeder according to at least one illustrative aspect of the invention.

Specifically, as shown in FIG. 13, a guide film 60 (functioning as a first guide member) and a guide film 61 (functioning as a second guide member) are disposed in the connection position 38. The guide film 60 is fixed at a corner portion (lower left side of the figure) in the connection position 38 where the reading position side of the document feed path 32 and the bypass 44 join, and is disposed along the document feed path 32. The guide film 60 extends so that its end reaches a corner portion (lower right side of the figure) where the input tray 30 side of the document feed path 32 and the bypass 44 joins so as to close the bypass 44. The guide film 60 is an elastically deformable film made of a synthetic resin, for example, and is disposed across the entire width of the document feed path 32 or a plurality of guide films 60 is disposed at specified intervals in the width direction.

The guide film 60 changes its position from a first guide position shown by a solid line in FIG. 13 to a second guide position shown by a double dotted line in FIG. 13 when its end is elastically deformed upward. The end of the guide film 60 is engaged in the corner portion where the input tray 30 side of the document feed path 32 and the bypass 44 join, so that its downward deformation from the first guide position is set. When the guide film 60 is in the first guide position, the feed path from the input tray 30 side (right side of the figure) to the reading position side (left side of the figure) of the document feed path 32 continues, whereas the feed path from the document feed path 32 to the bypass 44 (lower side of the figure) is closed. Thus, a document that has reached the connection position 38 from the input tray 30 side of the document feed path 32 is allowed to go to the reading position side of the document feed path 32, but not to the bypass 44. In addition, a document that has reached the connection position 38 from the bidirectional feed path 39 is allowed to go to the reading position side of the document feed path 32, but not to the bypass 44.

When the guide film 60 is in the second guide position, the feed path from the bypass 44 to the bidirectional feed path 39 (upper side of the figure) continues, whereas the feed path from the bypass 44 to the reading position side of the document feed path 32 is closed. Thus, a document that has reached the connection position 38 from the bypass 44 is allowed to go to the bidirectional feed path 39, but not to the reading position side of the document feed path 32.

Switching the feed path by the guide film 60 takes place when the document contacts the guide film 60. The guide film 60 is normally in the first guide position shown by the solid line in FIG. 13. A document being fed upward in the bypass 44 comes in contact with the guide film 60, so that the guide film 60 is elastically deformed so that it is pushed upward and placed in the second guide position shown by the double dotted line in FIG. 13. On the contrary, a document fed to the connection position 38 from the bidirectional feed path 39 comes in contact with the guide film 60. However, because the guide film 60 is not elastically deformed downward from the first guide position, the document is guided by the guide film 60 to go to the reading position side via the upper portion 32A of the document feed path 32.

The guide film 61 is fixed at a corner portion (upper right side of the figure) in the connection position 38 where the input tray 30 side of the document feed path 32 and the bidirectional feed path 39 join, and is disposed along the bypass 44. The guide film 61 extends so that its end reaches the corner portion where the input tray 30 side of the document feed path 32 and the bypass 44 join so as to close the document feed path 32. The guide film 61 is an elastically deformable film made of a synthetic resin, for example, and is disposed across the entire width of the document feed path 32 or a plurality of guide films 61 is disposed at specified intervals in the width direction.

The guide film 61 changes its position from a third guide position shown by a solid line in FIG. 13 to a fourth guide position shown by a double dotted line in FIG. 13 when its end is elastically deformed leftward. The end of the guide film 61 is engaged in the corner where the input tray 30 side of the document feed path 32 and the bypass 44 join, so that its rightward deformation from the third guide position is set. When the guide film 61 is in the third guide position, the feed path from the bidirectional feed path 39 to the reading position side of the document feed path 32 continues, whereas the feed path from the bidirectional feed path 39 to the input tray 30 side of the document feed path 32 is closed. Thus, a document that has reached the connection position 38 from the bidirectional feed path 39 is allowed to go to the reading position side of the document feed path 32, but not to the bypass 44. In addition, a document that has reached the connection position 38 from the bypass 44 is allowed to go to the bidirectional feed path 39, but not to the input tray 30 side of the document feed path 32.

When the guide film 61 is in the fourth guide position, the feed path from the input tray 30 side to the reading position side on the document feed path 32 continues, whereas the feed path from the input tray 30 side of the document feed path 32 to the bidirectional feed path 39 is closed. Thus, a document that has reached the connection position 38 from the input tray 30 side of the document feed path 32 is allowed to go to the reading position side of the document feed path 32, but not to the bidirectional feed path 39.

Switching the feed path by the guide film 61 takes place when the document contacts the guide film 61. The guide film 61 is normally in the third guide position shown by the solid line in FIG. 13. A document being fed from the input tray 30 side of the document feed path 32 comes in contact with the guide film 61, so that the guide film 61 is elastically deformed so that it is pushed leftward and placed in the fourth guide position shown by the double dotted line in FIG. 13. On the contrary, a document fed to the connection position 38 from the bypass 44 comes in contact with the guide film 61. However, because the guide film 61 is not elastically deformed rightward from the third guide position, the document is guided by the guide film 61 to go to the bidirectional feed path 39.

In this manner, as a first guide member and a second guide member according to the illustrative embodiment, the guide flaps 60 and 61 are designed to change their position by contact with the document, and there is no need to apply power from the motor or other power source to the guide flaps 60 and 61 for changing their positions. Thus, the first and second guide members can be provided with simple structure.

What is claimed is:

1. An automatic document feeder comprising:
    a feed path extending between an input tray configured to receive a document to be read and an output tray configured to receive a read document, the feed path extending past a scanning point;
    a bidirectional feed path connected to a connection point disposed upstream from the scanning point of the feed path;
    a bypass diverged from a branch position disposed downstream from the scanning point of the feed path, the bypass connected to the connection point;
    a first guide member configured to move in the connection point to a first guide position where the feed path continues from the input tray to the scanning point and a second guide position to connect the bypass and the bidirectional feed path; and
    a second guide member configured to move in the connection point to a third guide position to connect the bidirectional feed path and the scanning position of the feed path and a fourth guide position where the feed path continues from the input tray to the scanning point;
    wherein the feed path and the bidirectional feed path connect at the connection point.

2. The automatic document feeder according to claim 1, wherein the first guide member closes a path from the feed path to the bypass in the first guide position, and closes a path from the bypass to the scanning point of the feed path in the second guide position.

3. The automatic document feeder according to claim 1, wherein the first guide member maintains the first guide position until the first guide member moves to the second position by contact with a document being fed in the bypass toward the point.

4. The automatic document feeder according to claim 1, wherein the first guide member has a generally triangular shape and is provided pivotally between the first guide position and the second guide position.

5. The automatic document feeder according to claim 1, wherein the first guide member is a film that is elastically deformable between the first guide position and the second guide position.

6. The automatic document feeder according to claim 1, wherein the second guide member closes a path from the bidirectional feed path to the input tray of the feed path in the third guide position and a closes a path from the feed path to the bidirectional feed path in the fourth guide position.

7. The automatic document feeder according to claim 1, wherein the second guide member maintains the third guide position until the second guide member moves to the fourth guide position by contact with a document being fed from the input tray to the connection point.

8. The automatic document feeder according to claim 1, wherein the second guide member has a generally triangular shape and is provided pivotally between the third guide position and the fourth guide position.

9. The automatic document feeder according to claim 1, wherein the second guide member is a film that is elastically deformable between the third guide position and the fourth guide position.

10. The automatic document feeder according to claim 1, wherein the input tray and the output tray are vertically arranged and the feed path has a generally horizontal U shape in a vertical sectional view.

11. The automatic document feeder according to claim 10, wherein the connection point is disposed in a generally straight upper portion of the U-shape of the feed path, and the branch position is disposed in a generally straight lower portion of the U-shape of the feed path.

12. The automatic document feeder according to claim 11, wherein the bidirectional feed path extends from the upper portion in the U-shape of the feed path toward the input tray.

13. The automatic document feeder according to claim 12, wherein a path from the scanning point via the bypass to the bidirectional feed path is formed in a shape of an S in a vertical sectional view.

14. The automatic document feeder according to claim 10, wherein a length of the feed path from the connection point via the scanning point and the branch position to the bidirectional feed path is longer than a maximum size document for double-side reading.

15. An image forming apparatus comprising:
    the automatic document feeder according to claim 1; and
    an image reading device configured to read an image on a document passing the scanning point.

* * * * *

UNITED STATES PATENT AND TRADEMARK OFFICE
CERTIFICATE OF CORRECTION

PATENT NO. : 7,611,145 B2 Page 1 of 1
APPLICATION NO. : 11/515765
DATED : November 3, 2009
INVENTOR(S) : Toshitaka Iwago et al.

It is certified that error appears in the above-identified patent and that said Letters Patent is hereby corrected as shown below:

In Column 18, Claim 3, Line 14:
Please delete "point" and insert --connection point--

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,611,145 B2
APPLICATION NO. : 11/515765
DATED : November 3, 2009
INVENTOR(S) : Iwago et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this

Twelfth Day of October, 2010

David J. Kappos
*Director of the United States Patent and Trademark Office*